United States Patent [19]

Hoshino

[11] Patent Number: 4,750,401
[45] Date of Patent: Jun. 14, 1988

[54] LUG NUT ASSEMBLY FOR DRUMS
[75] Inventor: Yoshihiro Hoshino, Nagoya, Japan
[73] Assignee: Hoshino Gakki Co., Ltd., Japan
[21] Appl. No.: 14,487
[22] Filed: Feb. 13, 1987
[30] Foreign Application Priority Data Jul. 26, 1986 [JP] Japan .............. 61-114752[U]

[51] Int. Cl.⁴ ............................................. G10D 13/02
[52] U.S. Cl. .................................................... 84/413
[58] Field of Search .................................. 84/411–421

[56] References Cited

U.S. PATENT DOCUMENTS 3,139,783 7/1964 Grant et al. .............. 84/411 R
4,206,681 6/1980 Kluczynski et al. ...... 84/411 R
4,282,793 8/1981 Muchnick ..................... 84/414

FOREIGN PATENT DOCUMENTS 1556927 12/1979 United Kingdom .
2017998 7/1982 United Kingdom .

Primary Examiner—Lawrence R. Franklin
Attorney, Agent, or Firm—Ostrolenk, Faber, Gerb & Soffen

[57] ABSTRACT

An improved lug nut assembly for securing hoops to a drum is provided by a special retainer mechanism. A lug nut is held in an opening in the lug by a combination of a ridge portion preventing outward movement and a U-shaped spring which prevents the lug nut from slipping into the lug. The spring rests partially in a cutaway section of the lug nut and on an internal ridge within the lug.

6 Claims, 2 Drawing Sheets

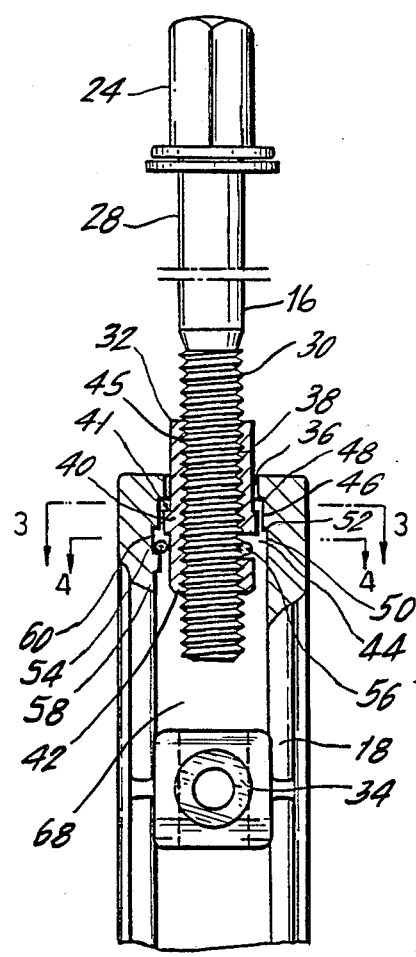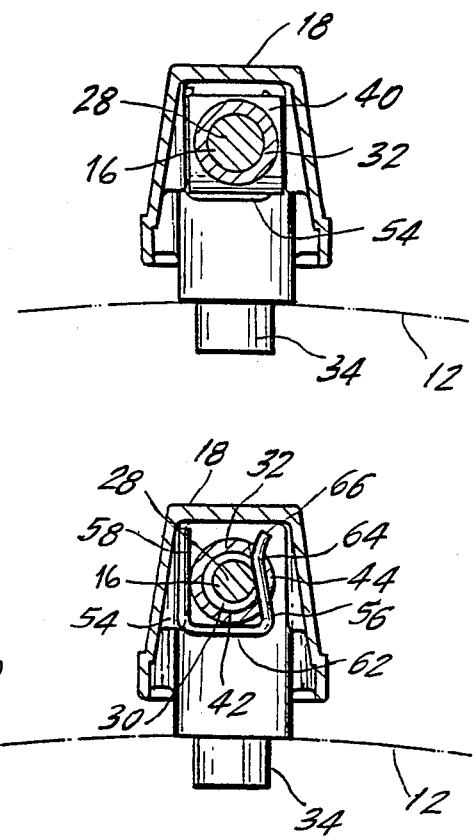

LUG NUT ASSEMBLY FOR DRUMS

BACKGROUND OF THE INVENTION

1. Field of the Invention

This invention relates to hardware for drums. More particularly, this invention relates to an improved design for a lug and lug nut for a drum.

2. Description of the Prior Art

Musicals drums are equipped with playing surfaces called heads. The heads are secured to the frame of the drum, which is essentially a cylinder, by circular hoops. The hoops are placed over the peripheries of the heads. The combination of the head and hoop is held in place against the open end of the cylinder by bolts passing through flanges in the hoop. The ends of the bolts, which are threaded, are received in nuts held in lugs secured to the outside of the drum cylinder. Generally, the nuts are held in place by the tension of their bolts. If a bolt should become excessively loose, there is a possibility that the lug nut will fall into the lug. Further, on occasion, the lug bolt will loosen because of the vibration of the instrument resulting from its being played.

OBJECTS OF THE INVENTION

It is an object of the invention to provide an improved lug nut arrangement for a drum.

It is a further object of the invention to provide an improved lug nut which will afford easier installation and maintenance.

It is a further object of the invention to provide an improved lug nut which will resist loosening during use.

SUMMARY OF THE INVENTION

These objects as well as others not enumerated here are achieved by the invention, one embodiment of which includes a drum lug having a captured lug nut which is held in place by a U-shaped spring having one leg residing in a cut out portion of the lug. The lug nut is cut away on one side to receive the other leg of the spring.

The lug assembly according to the invention uses the combination of the spring and cutaway lug to capture the lug nut and hold it in place at the opening of the lug. This placement permits one to tighten, loosen, or completely disengage the bolts securing the heads on a drum without fear of having the nuts fall into the lug housing.

BRIEF DESCRIPTION OF THE DRAWINGS

A more complete understanding of the present invention, as well as other objects and advantages thereof not enumerated, will become apparent upon consideration of the following detailed description, especially when considered in light of the accompanying drawings, wherein:

FIG. 2 is a partial sectional view of the lug assembly according to the invention;

FIG. 3 is a sectional view of the lug assembly illustrated in FIG. 2 taken along lines 3—3; and FIG. 4 is a sectional view of the lug assembly shown in FIG. 2 taken along lines 4—4.

DESCRIPTION OF THE PREFERRED EMBODIMENT

Figure 1:
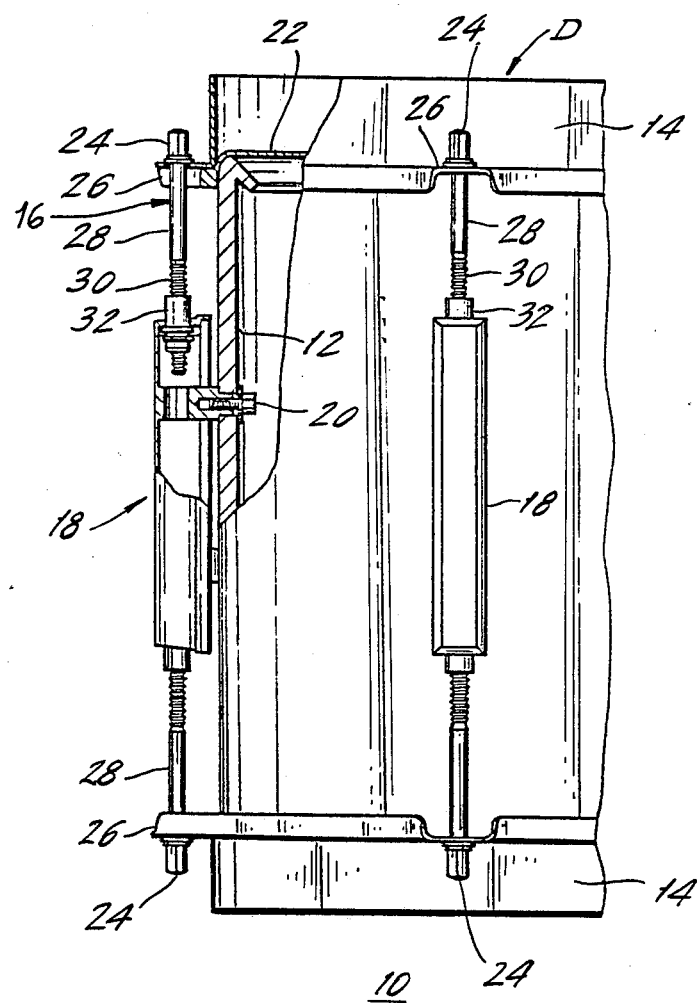
FIG. 1 is a partial sectional view of a drum having a lug nut arrangement according to the invention.

The structure of the lug assembly can be best explained by reference to FIG. 1. The drum 10 has a cylindrical body 12 having hoops 14 at either end. A hoop 14 has the shape of a cylindrical band above the drum body and an axially inward section for receiving bolts 16. The hoops 14 are secured to the drum body 12 by axially extending bolts 16, which are attached to axially extending lugs 18 mounted to the drum body 12 by mounting bolts 20.

The hoops 14 serve to hold the drum heads 22 in place against the drum body 12. The tension of the heads is adjusted by tightening the bolts 16. The bolts 16 have axially outward bolt heads 24 which rest on the hoop flanges 26, through which the shanks 28 of the bolts 16 pass. The bolts 16 terminate in axially inward threaded portions 30 which are secured by lug nuts 32 held at the respective lug 18 which is disposed between a pair of bolts holding both heads.

One lug 18, one bolt 16, and its lug nut 32 are shown in FIG. 2. The lug 18 has a threaded receptacle 34 which receives the mounting bolt 20. The lug nut 32 is received in the lug 18 through a bore 36. The one piece lug nut 32 has an axially outward portion 38, a middle portion 40, and an axially inward portion 42. The diameter of the axially outward portion 38 is slightly less than the diameter of the bore 36. The middle portion 40 has a generally square cross-section (FIG. 3) which is greater than that of the upper portion 38. The difference in the cross-section defines a ledge or seat 41. The middle portion 40 in turn is connected to the axially inward portion 42 which has a diameter approximately that of the axially outward portion 38. Also, the axially inward portion 42 has a cutout section 44 just below the middle portion 40. The lug nut 32 is provided with an internally threaded bore 45, which intersects the cutout section 44. Bore 45 threadedly receives the threaded portion 30 of the bolt 16. When they are assembled, the threaded portion 30 of the bolt 16 extends through the lug nut 32 (FIG. 2).

The interior of the lug 18 complements the external configuration of the lug nut 32. Below the narrowed bore 36 in the lug 18 is a first instep 46 which has a first horizontal axially inwardly directed face 48. The first horizontal face 48 is abutted by the seat 41 of the lug nut 32. The height of the first instep 46 is approximately the length of the middle portion 40 of the lug nut 32. The first instep 46 terminates in a second instep 50 which defines a second horizontal axially inwardly directed face 52.

The lug nut 32 is partially encircled by a U-shaped spring 54. The spring 54 has a first leg 56 in the cutout section 44 and resting against the threaded portion 30 of the bolt 16. The second leg 58 of the spring 54 is disposed external to the lug nut 32 and rests in an internal groove 60 below the face 52 in lug 18. Movement of the lug nut 32 into the hollow of the lug 18 is impeded by the axially inward end of the groove 60 being contacted by the second leg 58 of the spring.

The lug nut 32 and its relationship to the U-shaped spring 54 are seen in FIGS. 3 and 4. In FIG. 3, the bolt 16, the lug nut 32, and the lug 18 are visible. Partially visible is the U-shaped spring 54. As previously noted, the middle portion 40 of the lug nut 32 has a generally square cross-section. The instep 46 has a complementary cross-section.

In FIG. 4, the axially inward portion 42 of the lug nut 32 and the entire U-shaped spring 54 can be seen. The first leg 56 is connected to the second leg 58 by a middle segment 62. Further, the first leg has an inwardly bent intermediate portion 64 connected to an outwardly bent tip portion 66.

The assembly shown in FIG. 2 can be used at either end of a lug 18, as illustrated in FIG. 1. Regardless of the orientation of the lug nut 32 and bolt 16 with respect to the lug 18, the assembly will prevent the lug nut 32 from slipping away from the bolt 16 and into the hollow 68 of the lug 18.

To assemble the device, the lug nut 32 is inserted into the bore 36 from the hollow 68 of the lug 18. The U-shaped spring 54 is then pressed onto the lug nut 32 so that the first leg 56 enters the cutout section 44 and the second leg 58 enters the groove 60. The same operation occurs with a second lug nut 32 at the end of the lug 18, if appropriate. This combined assembly is then placed on the drum 10 and fastened with a mounting bolt 20. After the hoops 14 are placed over their respective heads 22, the bolts 16 are dropped through the hoop flanges 26 and their threaded portions 30 engage with adjacent lug nuts 32. Thereafter, the bolts 16 can be tightened, loosened, or completely disengaged without fear of having the lug nuts 32 fall into the hollow 68 of the lug 18.

While there has been described what is believed to be the preferred embodiment of the invention, those skilled in the art will recognize that other and further modifications may be made thereto without departing from the spirit of the invention, and it is intended to claim all such embodiments that fall within the true scope of the invention

What is claimed:

1. A lug and nut assembly for a bolt securing a head on a drum, comprising:

an internally threaded lug nut for engagement with a bolt; said lug nut having a middle section extending diametrically beyond the remaining diameter of said lug nut; and said lug nut having a cutout section below said middle section, said cutout section intersecting said internal threads:

a lug attached to the side of a drum extending parallel to the axis of the drum; the lug having an opening in it in which the lug nut is placed; a seat in the lug, placed and shaped for interfering with movement of the lug nut past the seat and out of the lug opening; the lug nut middle section engaging the seat, upon a bolt being tightened into the lug nut, for preventing the lug nut from exiting from the lug opening;

a resilient spring inside the lug having a generally U-shape with a first leg engaging the lug nut cutout section, a second leg, and a middle section connecting the first and second legs and;

means in said lug for receiving said second leg for preventing the lug nut from slipping further into the lug.

2. A lug and lug nut assembly as set forth in claim 1, wherein the first leg of the spring in the cutout section has an inwardly bend intermediate portion and an outwardly bent tip portion.

3. The assembly of claim 1, wherein the lug has opposite ends, the opening being defined at the opposite ends and a respective one of the lug nuts being received in the lug at each end of the lug.

4. A drum comprising a drum body, a plurality of lug and nut assemblies of claim 1, each lug being secured to the drum body spaced around the body from a neighboring one of the lugs; the drum body having an end with a drum head over it; a hoop around the head and the body; the respective bolt for each nut engaging the hoop and being secured in the respective nut for securing the head through the hoop to the body.

5. The assembly of claim 1, further comprising a bolt for being threadedly received in the lug nut.

6. The assembly of claim 5, wherein the first leg of the spring engages the bolt through the cutout section.

* * * * *